United States Patent [19]

Davis

[11] Patent Number: 5,892,846
[45] Date of Patent: Apr. 6, 1999

[54] PROCESS AND APPARATUS FOR READING A DOT MATRIX CODE MARKING ON AN ARTICLE

[75] Inventor: Neil A. Davis, Derby, England

[73] Assignee: Rolls-Royce plc, London, United Kingdom

[21] Appl. No.: 608,574

[22] Filed: Feb. 28, 1996

[30] Foreign Application Priority Data

Apr. 6, 1995 [GB] United Kingdom .................... 9507098

[51] Int. Cl.⁶ ............................... G06K 9/03; G06K 9/62
[52] U.S. Cl. ............................ 382/217; 382/309; 235/462
[58] Field of Search .................................... 382/100, 141, 382/144, 152, 209, 212, 214, 216, 217, 218, 190, 195, 203, 204, 201, 309, 310, 183; 235/435, 462, 487, 494; 250/271; 348/86, 125, 129; 340/825.3; 364/478.03, 478.09, 478.12, 478.13, 478.14

[56] References Cited

U.S. PATENT DOCUMENTS

| | | | |
|---|---|---|---|
| 4,408,342 | 10/1983 | Grabowski et al. ..................... | 382/309 |
| 4,809,342 | 2/1989 | Kappner .................................. | 382/212 |
| 4,916,293 | 4/1990 | Cartlidge et al. ........................ | 348/86 |
| 5,128,526 | 7/1992 | Yoshida ................................... | 235/494 |
| 5,202,552 | 4/1993 | Little et al. ............................. | 235/494 |
| 5,329,107 | 7/1994 | Priddy et al. ........................... | 235/494 |
| 5,357,095 | 10/1994 | Weyrauch et al. ...................... | 235/494 |
| 5,452,373 | 9/1995 | Shou et al. .............................. | 382/209 |

*Primary Examiner*—Amelia Au
*Assistant Examiner*—Larry J. Prikockis
*Attorney, Agent, or Firm*—W. Warren Taltavull; Farkas & Manelli PLLC

[57] ABSTRACT

A process and associated apparatus can automatically read a dot matrix code marking on an article even when the marking has been partly obscured or damaged in some way. The process comprises capturing a video image of the dot matrix code and correlating points on the captured image with a mask of expected dot appearance, using a known two-dimensional correlation technique. However, the correlation is performed in accordance with certain thresholding and mask adjustment criteria to improve read reliability and map the possible dot pattern in preparation for an attempt at reading the code. After automatically reorientating the map of possible dots to a read orientation if necessary, decoding of the pattern of possible dots is then attempted by comparing it with a datum grid representing rows and columns of valid dot matrix codes. The process can output a signal affirming that a valid code has been found.

18 Claims, 3 Drawing Sheets

PROCESS AND APPARATUS FOR READING A DOT MATRIX CODE MARKING ON AN ARTICLE

THE FIELD OF THE INVENTION

The invention relates to a process and apparatus for reading a dot matrix code marking on an article.

BACKGROUND OF THE INVENTION

It is often required for components to be individually identified as they pass through a series of manufacturing stages so that a history of their manufacture is available for reference. One known method of identification is disclosed in our U.K. Patent No. 2201808.

These components or workpieces are conveniently provided with a dot matrix code identification marking and the dot matrix code is read using an optical reader. The dot matrix code marking comprises a plurality of rows and columns on which dots comprising the code marking are located. The reader produces an output which is converted into a digital form by a processor. A further processor is provided to determine the orientation and position of the dot matrix code from the digitised image. The further processor works by calculating the outer borders of the dot matrix code from the individual dots in the digitised image. This means that the edge of the dot matrix code has to have a reasonable number of dots along it and each dot must be accurately located. However, not all dot matrix codes meet these requirements because the edges of some dot matrix codes have very few dots and in some cases the image processing performed to locate the dots is insufficient to locate all the dots. Our U.K. Patent Application No. 9405337.8 describes a method and apparatus for identifying the orientation of a dot matrix code marking of an article. However, there still remains the problem of reading a code that has been partly obscured or damaged during processing of the article.

SUMMARY OF THE INVENTION

The present invention seeks to provide a process and apparatus for reading a dot matrix code marking on an article even when the marking has been obscured or damaged in some way.

Accordingly, in its broadest aspect, the present invention provides a process for automatically reading a dot matrix code marking on an article even when the marking has been partly obscured or damaged, comprising:

capturing an image of the dot matrix code, two-dimensionally correlating points on the captured image with a mask of expected dot appearance to produce a map of possible dots in the captured image, automatically reorientating the map of possible dots to a read orientation if necessary;

attempting to read the pattern of possible dots as a dot matrix code, and outputting a signal dependent upon a successful attempt to read the dot matrix code;

wherein the correlation is performed in accordance with predetermined thresholding and mask adjustment criteria to improve read reliability and decoding of the pattern of possible dots is attempted by comparing it with a datum grid representing valid dot matrix code patterns.

In more detail, the invention provides a process for reading a dot matrix code marking on an article, the dot matrix code marking having a plurality of rows and columns in which dots comprising the code marking are located, the process comprising the steps of:

a) capturing an image of the dot matrix code;

b) correlating points on the captured image with a mask of expected dot appearance;

c) setting a threshold for correlation between the points on the captured image and the mask;

d) mapping the points in the captured image having a correlation above the threshold to produce an map of possible dots in the dot matrix code;

e) as necessary, in accordance with predetermined criteria, adjusting the threshold to improve read reliability and repeating step d);

f) as necessary, in accordance with predetermined criteria, adjusting the mask to improve read reliability and repeating steps b) to e);

g) if necessary, orientating the map of possible dots to a read orientation;

h) generating a grid consisting of a predetermined number of rows and columns of cells, the grid being generated over the possible dots such that the grid defines a cell around each possible dot falling within said predetermined number of rows and columns;

i) attempting to decode the pattern of possible dots falling within the cells of the generated grid by reference to a datum grid representing rows and columns of valid dot matrix codes; and j) if a valid code is found, outputting a signal affirming that a valid code has been found.

In our preferred process, if no valid code is found, a decreased threshold is set and steps c) to i) are repeated.

The predetermined criteria in step f) may be that if more than a predetermined maximum number of possible dots are mapped, the mask is adjusted by generating a further mask of dot appearance, the further mask comprising a reproduction of that dot in the image of the dot matrix code which correlates most closely to the initial mask.

The predetermined criteria in step e) may be that if less than a predetermined minimum number of possible dots are mapped, the threshold is adjusted by decreasing the threshold by a predetermined amount, provided that the threshold is not decreased below a predetermined minimum value. Preferably, if the threshold is decreased below the predetermined minimum value, a further mask of dot appearance is generated, the further mask comprising a reproduction of that dot in the image of the dot matrix code which correlates most closely to the initial mask.

Preferably, to avoid false detections of dot matrix codes, the process ensures that a further mask can only be generated once. Therefore, if the threshold decreases to less than the predetermined minimum for a second time, or if there is a second occasion when there are more than a predetermined maximum number of dots with a correlation above the threshold, a signal is outputted signifying a failure to read the dot matrix code.

The grid in step h) may be generated over the possible dots by continuously adjusting the relative positions of the cells with respect to the dots to ensure that the dots are contained within the cell boundaries forming the generated grid.

Decoding of the pattern of possible dots may be accomplished by comparing the datum grid with the generated grid and outputting a valid code signal if a minimum number of cells containing dots in the generated grid correspond to cells in the datum grid.

Before outputting a signal affirming that a valid code has been found, the validity of the code is checked by reference to error correcting bits and cyclic redundancy checks built into the dot matrix code.

As in prior referenced patent applications, the dots of the dot matrix code may conveniently comprise indentations in a surface of the article. To obtain good contrast of the dots with the surrounding surface, the dot matrix code is preferably illuminated by a strong light source shining obliquely onto the surface. A suitable strong light source is provided by at least one, preferably several, bright light emitting diodes.

The initial mask preferably represents the appearance of an obliquely illuminated clean dots in a dot matrix code. However, it may be advantageous to change the initial mask at the option of the operator, because the appearance of the dots in any such dot matrix code depends on the previous processing applied to the article and on the illumination of the dots.

Advantageously, the captured image is a video image captured by a video camera and a video frame store. Preferably, the video camera is a CCD camera.

Correlation may be performed by scanning of the captured video image line by line and pixel by pixel. Alternatively, to speed up scanning rates, selected ones of the pixels and/or lines of the captured video image may be omitted from the scanning process.

The present invention also provides apparatus capable of performing the above process.

BRIEF DESCRIPTION OF THE DRAWINGS

An exemplary embodiment of the invention will now be described with reference to the accompanying drawings, in which.

DETAILED DESCRIPTION OF THE INVENTION

Figure 1:
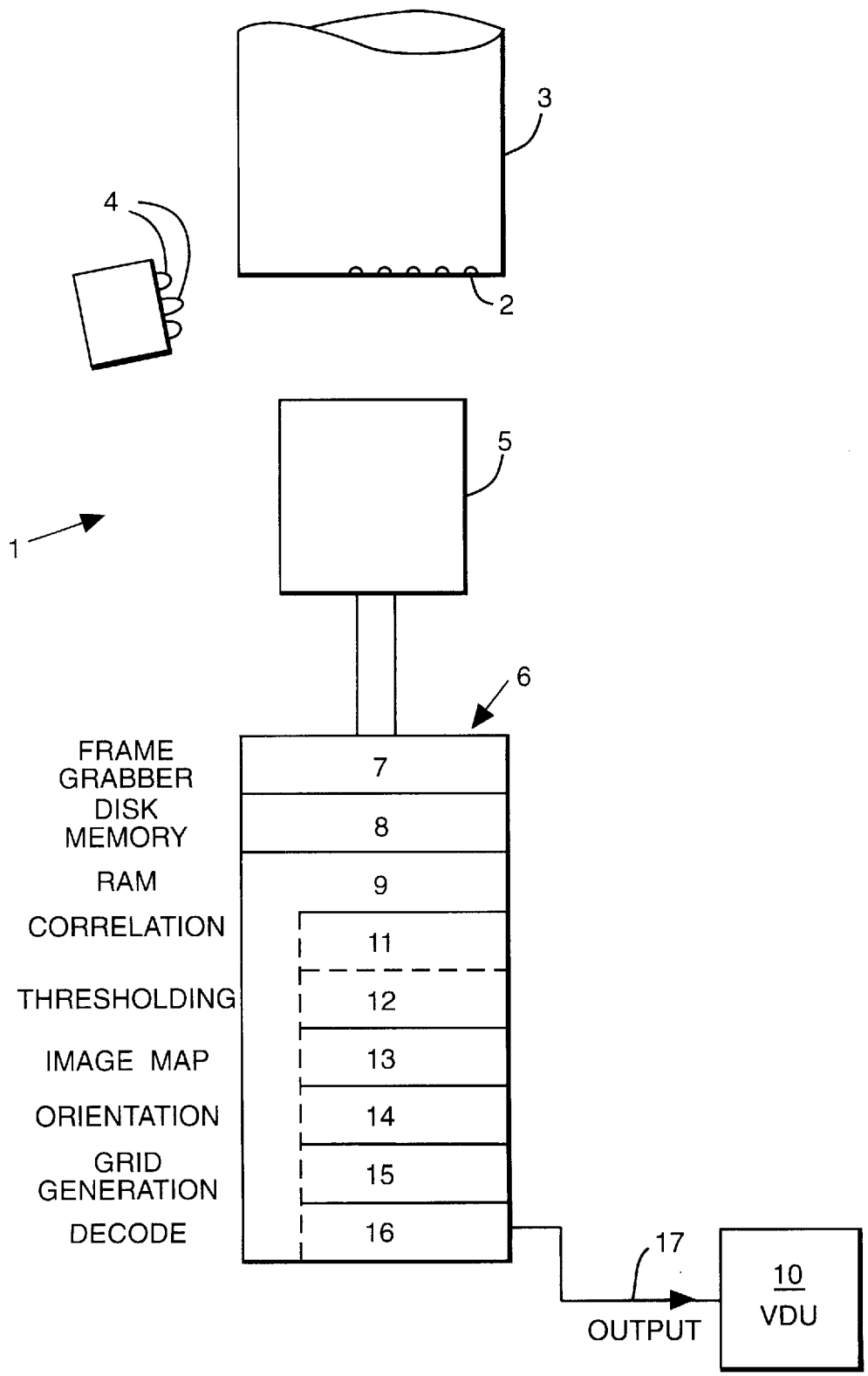
FIG. 1 is a schematic illustration of an apparatus according to the present invention.

Referring to FIG. 1, an apparatus 1 for reading a dot matrix code marking 2 on an article 3 comprises bright LED's for illuminating the dot matrix code 2 on the article 3 and a video camera 5, for example a CCD camera, for viewing the illuminated dot matrix code 2. The LED's 4 are arranged to direct light at a low angle of incidence to the surface of the article 3 to increase the contrast of the dots in the dot matrix code 2.

The camera 5 produces a video output signal corresponding to an image of the dot matrix code 2. The output signal is supplied to a computer 6, for example a personal computer, which has a frame grabber card 7 to grab and store the image of the dot matrix code 2.

A predefined initial default mask of expected dot appearance is stored in memory 8 of the computer 6, e.g. on a hard disk. This mask, corresponding to an image of sidelit, clean dots, is loaded from disk 8 into RAM 9 of the PC. However, it will be modified during subsequent stages of the process, as explained later.

At certain stages of the processing it may be known that the dot appearance will be different, for example the dots may be filled with dirt. In such a case, it may be advantageous if one or more alternative masks are also stored on disk 8, so that the operator can exchange the initial default mask for an alternative initial mask corresponding to the expected dot appearance at that particular stage of processing.

If insufficient correlation between the dots and the initial mask is found, the system generates a further mask. To do so, it selects the dot in the captured image having the best correlation with the initial mask, reduces the expected correlation between image and mask by a certain amount, e.g., 20%, so as to include further dots which fit with the reduced correlation, and generates the further mask, consisting of dots which reproduce the selected dot in the captured image.

The correlation process above is a two dimensional correlation carried out by correlation software 11. Two dimensional correlation is a well known mathematical process and can be readily coded for incorporation in image processing software such as is used for the present invention. The correlation software 11 scans the image pixel by pixel and line by line. If a faster reading is required, the correlation can be carried out using a selectable "skip" function so that, e.g., the correlation software 11 only scans every other pixel and every other line. Full scanning gives slightly better definition and fewer errors in decoding, but the system is still able to correctly read dot matrix codes even with incomplete scanning.

A VDU 10 can be used to display the image at any of the stages of image processing, if desired. However, in a system for production line use, this would not be necessary, since the output 17 of the system can be merely a switching signal to give an aural and/or visual indication that the dot matrix code 2 viewed by camera 5 has or has not been successfully decoded.

Figure 2A:
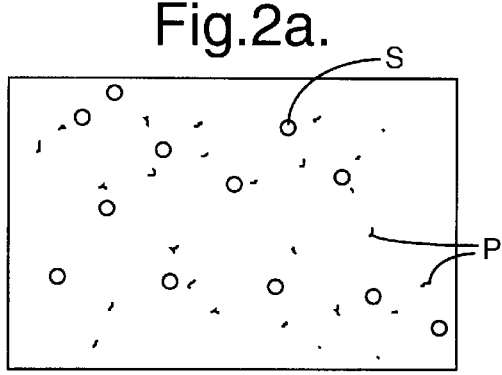
FIGS. 2 a to d are sketches of exemplary images on a VDU which illustrate the steps of carrying out of the process of the invention.

FIG. 2a is a representation of a VDU image showing the results of the above initial correlation step, the image showing the dots of the code 2 as bright spots S, with scattered points P of noise. At this stage, some of the spots S may be defects or foreign matter on the surface of the article being examined, rather than part of the dot matrix code 2, having been misidentified by the initial correlation process.

Correlation software 11 works in conjunction with thresholding software 12, which sets a predetermined initial threshold for the correlation process so that only dots on the image having a correlation above the threshold are selected as being acceptably correlated to the mask. In our preferred method, we allocate to each dot a measure of correlation to the mask on a scale of 0 to 63. For instance, if the initial threshold is set at a high level, e.g. 50, then very few dots will be selected, but if the threshold is reduced, more would show up on the FIG. 2a VDU image.

We prefer that if the number of dots above the initial threshold is less than a predetermined number needed for decoding, for example 20, then the threshold is dropped by, say, 4 on the scale of correlation and the correlation process is repeated. If the number of dots selected is sufficient for decoding, but no code can be derived, then the threshold is dropped by a smaller amount, say 2, before the correlation process is repeated. If the number of dots selected is greater than a predetermined number, say 100, this is taken to be indicative that a new mask is required to set stricter correlation standards. Consequently, a new mask is generated, consisting of dots which reproduce that dot in the captured image having the best correlation to the initial mask.

Figure 2B:
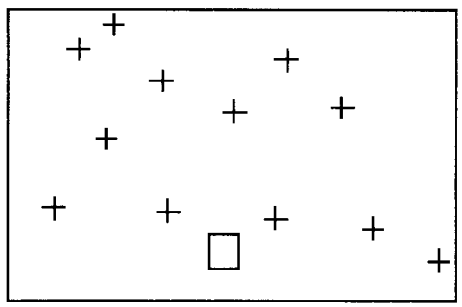

After the correlation thresholding process is completed, an image map 13 exists in RAM, corresponding to those dots which have a correlation above the threshold. If the image map 13 is displayed on VDU 10, an image like FIG. 2*b* can be generated.

If enough dots have been mapped for decoding to be attempted then the orientation of the columns and rows of dots in the mapped image is checked by orientation software 14, described in more detail in our prior patent application GB9405337.8. First the inter-dot spacings are found and the angle between one of the rows having the shortest inter-dot spacings (which is either the column or row axis of the dot matrix code) and a predefined normal axis is found. If necessary, the image is then rotated through that angle to a normal orientation in which it may be possible to decode it or "read" it. This may be termed a first attempt at a "read orientation".

Next, a histogram of the inter-dot spacings is formed and the column and row spacings of the dots are extracted. The image is then checked to ensure if it requires reorientation. Reorientation may be necessary because there was no way of knowing (assuming the spacings between the dots in the rows and in the columns are identical) whether the row of dots selected above because it had the shortest inter-dot spacings, represented a row or a column in the actual dot matrix code. In this example we are considering a 6×15 matrix, so in effect the image is checked to see if there are 15 dots along from left to right and if not the image is rotated through a right angle to obtain a final read orientation.

The actual process by which the reorientation in the previous sentence is achieved comprises summing the squares of the inter-dot spacings for all dots lying on lines running parallel to the above-mentioned normal axis. This may be designated the x-direction. Similarly, the squares of the inter-dot spacings are summed for all dots lying on lines running at right angles to the normal axis. This may be designated the y-direction. If the sum of the squares of the inter-dot spacings in the x direction are greater than the sum of the squares of the inter-dot spacings in the y direction, then the image is in the correct orientation. Otherwise, the image must be rotated through a right angle so that it can be accurately decoded.

Figure 2C:
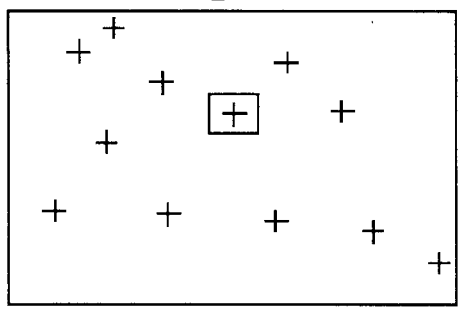
Figure 2D:
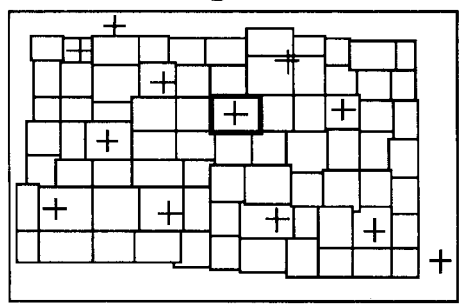

To enable decoding to be attempted, grid generation software 15 constructs a so-called "set grid" over the dots in the image map resulting from the above process. We prefer the set grid to comprise a 20×20 set of cells. Firstly, the centre of the group of dots in the image is found from the average dot position. The closest dot to the centre is found and a cell is placed around it (FIG. 2*c*). The set grid is then produced by spreading out from the centre cell first vertically for 10 cells up and down and then horizontally 10 cells left and right, with the grid being adjusted for the dot positions on the image (shown for a smaller grid in FIG. 2*d*).

Decoding software 16 then calls up a datum grid from disk 8. This is positioned and moved over the set grid column by column and row by row until at least 20 cells of the set grid that contain dots are covered by the datum grid. Any dots outside the datum grid are then ignored and decoding of the dot matrix code is attempted by translating the pattern of dots thus captured in the datum grid into a numerical code and comparing it with a list of allowable codes held on disk 8. Decoding is attempted in two orientations of the mapped image of the dots, first at the actual orientation and secondly at 180° to the actual orientation, in case the image is upside-down.

Note that the dot matrix code includes error correction bits and cyclic redundancy checks and the decoding software 16 uses these to construct the dot matrix code from the dots found in the datum grid. If a valid code is found, an output signal 17 to this effect is generated and the value of the valid code may be output to VDU 10, which may also display the number of errors found in the datum grid that have been corrected for, as a measure of the quality of the initial image of the dot matrix code. However, if no valid code is found, the thresholding software 12 reduces the threshold by, say, 2 and the process is repeated.

In this example a 6×15 matrix is used for the dot matrix code 2. This has 10 groups of 9 dots, 8 of the groups, providing the code and 2 providing cyclic redundancy checks. Each 9 dot group consists of 5 data bits and 4 error correcting bits. The error correction allows correction for one missing dot in any group and the code arrangement used allows the corners to be lost without losing 2 dots from any one code group.

Figure 3:
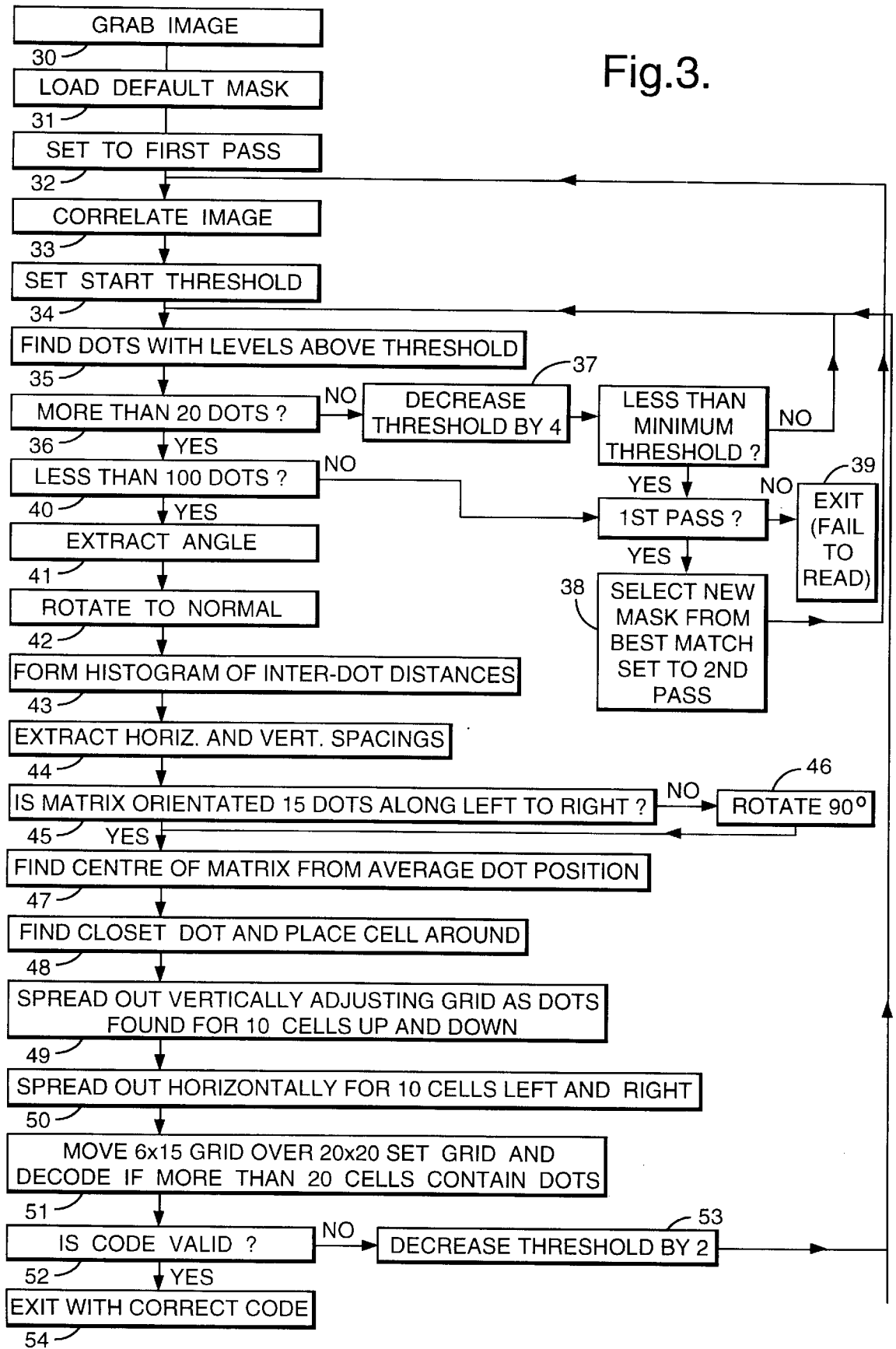
FIG. 3 is software flow chart illustrating the steps of a process according to the invention.

FIG. 3 shows a flow chart illustrating the steps of an exemplary process according to the invention. The article 3 is positioned in front of the camera 5 and the computer 6 carries out the steps of the process as follows:

GRAB IMAGE (30)—the image is grabbed and stored so that the article 3 does not have to be held continuously in front of the camera 5 during processing;

LOAD DEFAULT MASK (31)—the initial default mask is loaded. Depending on the expected dot appearance, an alternative initial mask may be selected at the option of the operator, as previously described.

SET TO FIRST PASS (32)—the computer 6 notes that this is the first pass;

CORRELATE IMAGE (33)—two dimensional correlation of the image is carried out. If faster reading is required then the correlation is carried out using a pixel and/or line "skip" function.

SET START THRESHOLD (34)—each dot has a measure of fit to the mask of between 0 and 63 (0 being no correlation at all and 63 being perfect correlation) The start threshold is set at 50.

FIND DOTS WITH LEVELS ABOVE THRESHOLD (35)—only dots with levels above the threshold are considered. If the threshold is high then only a few dots will show up.

MORE THAN 20 DOTS? (36)—the computer assesses whether there are more than 20 dots. If not, then the process follows loop 37 to decrease the threshold by 4 and check that it is not less than a predefined minimum threshold. As long as the threshold is not less than the minimum this loop is repeated until more than 20 dots are found. If the threshold is reduced to less than the minimum threshold then the process goes to loop 38. If this is the first pass then a new mask is generated from the best correlation to the dots on the image, the computer notes that this is the second pass and the process returns to step 33. If this is not the first pass then the process EXITS 39, giving a "fail to read" signal or message. If there are more than 20 dots the process goes to step 40.

LESS THAN 100 DOTS? (40)—if there are more than 100 dots the process follows loop 38 to generate a new mask if it is the first pass and to EXIT 39 if it is not. If there are less than 100 dots the process goes to steps 41 to 46 to check the matrix orientation.

EXTRACT ANGLE (41)—the angle between a line of minimum distance between the dots are found.

ROTATE TO NORMAL (42)—the EXTRACT ANGLE step gives the angle of rotation required to turn the image so that either the rows or the columns of the dots are parallel to a defined (x) axis. The image is rotated through the required angle to establish a first attempt at a "read orientation".

FORM A HISTOGRAM OF INTER-DOT DISTANCES (43)—the distances between adjacent dots are found and a histogram of the distances is formed.

EXTRACT HORIZONTAL (ROW) AND VERTICAL (COLUMN) SPACINGS (44)—from the histogram, the spacings between the dots in the "x" and "y" directions respectively are found.

IS MATRIX ORIENTATED 15 DOTS ALONG LEFT TO RIGHT? (45)—this question is answered using the method described previously, comprising summing the squares of the inter-dot distances in the x and y directions. If not then the image is rotated by 90° (46) to a final read orientation. If it is already oriented to a read orientation, or when it has been rotated, then step 47 is carried out.

FIND CENTRE OF MATRIX FROM AVERAGE DOT POSITION (47)—the positions of all the dots found are considered and the centre is determined from the average positions.

FIND CLOSEST DOT AND PLACE CELL AROUND (48)—the dot closest to the centre position is found and the first cell of a 20×20 set grid is placed around it.

SPREAD OUT VERTICALLY ADJUSTING GRID AS DOTS FOUND FOR 10 CELLS UP AND DOWN (49)—the set grid is then built outwards from the centre cell, using the vertical (y-direction) spacing derived in step 44, with any slight cell dimension adjustments necessary to ensure the dots fall within the cells of the set grid.

SPREAD OUT HORIZONTALLY FOR 10 CELLS LEFT AND RIGHT (50)—using the spacing in the x direction found in step 44, the set grid is then spread out along the grid with similar adjustments as required. Any dots then outside the 20×20 grid are disregarded.

MOVE 6×15 GRID OVER 20×20 SET GRID AND DECODE IF MORE THAN 20 CELLS CONTAIN DOTS (51)—a 6×15 datum grid is centred on the set grid and moved over the set grid until more than 20 of the datum grid cells contain dots. Decoding of the dot pattern so defined is then attempted.

IS CODE VALID? (52)—the computer 6 assesses if a code has been found and whether the code is a valid one. If it is not then loop 53 is followed, the threshold is decreased by 2 and the process returns to step 33. If a valid code is found the process goes to step 54.

EXIT WITH CORRECT CODE (54)—it has been found that if a code is validated by the preceding steps, then this will be the correct code, therefore if a valid code is found this is output from the system.

Note that the matrix code contains error correction bits and cyclic redundancy checks which allow a missing dot from any portion of the code to be corrected for and the code is distributed throughout the matrix so that parts of the matrix may be damaged without losing the code.

It has been found that the process and apparatus of the invention allow the code to be read following many processing steps on the article thus overcoming many of the disadvantages that have been found with dot matrix marking of articles in the past. The code can be read even if the process applied to the article affects the appearance of the dot matrix code or even if the code is partly obliterated.

I claim:

1. A process for reading a dot matrix code marking on an article, the dot matrix code marking having a plurality of rows and columns in which dots comprising the code marking are located, the process comprising the steps of:
   a) capturing an image of the dot matrix code;
   b) correlating points on the captured image with a mask of expected dot appearance;
   c) setting a threshold for correlation between the points on the captured image and the mask;
   d) mapping the points in the captured image having a correlation above the threshold to produce a map of possible dots in the dot matrix code;
   e) where the image fails to meet predetermined read reliability criteria, adjusting the threshold to improve read reliability and repeating step d)
   f) where the image fails to meet predetermined read reliability criteria, adjusting the mask to improve read reliability and repeating steps b) to e);
   g) where the image fails to meet an orientation criteria, orientating the map of possible dots to a read orientation;
   h) generating a grid consisting of a predetermined number of rows and columns of cells, the grid being generated over the possible dots such that the grid defines a cell around each possible dot falling within said predetermined number of rows and columns;
   i) attempting to decode the pattern of possible dots falling within the cells of the generated grid by reference to a datum grid representing rows and columns of valid dot matrix codes; and
   j) if a valid code is found, outputting a signal affirming that a valid code has been found.

2. A process according to claim 1, in which if no valid code is found, a decreased threshold is set and steps d) to i) are repeated.

3. A process according to claim 1 or claim 2, in which the predetermined criteria in step f) are that if more than a predetermined maximum number of possible dots are mapped, a further mask of dot appearance is generated, the further mask comprising a reproduction of that dot in the image of the dot matrix code which correlates most closely to the initial mask.

4. A process according to claim 1, in which the predetermined criteria in step e) are that if less than a predetermined minimum number of possible dots are mapped, the threshold is decreased by a predetermined amount, provided that the threshold is not decreased below a predetermined minimum value.

5. A process according to claim 4, in which if the threshold is decreased below the predetermined minimum value, a further mask of dot appearance is generated, the further mask comprising a reproduction of that dot in the image of the dot matrix code which correlates most closely to the initial mask.

6. A process according to claim 3, in which, to avoid false detections of dot matrix codes, a further mask is generated only once.

7. A process according to claim 6, in which, if the threshold decreases to less than the predetermined minimum for a second time, or if there is a second occasion when there are more than a predetermined maximum number of dots with a correlation above the threshold, a signal is outputted signifying a failure to read the dot matrix code.

8. A process according to claim 1, in which the grid in step h) is generated over the possible dots by continuously adjusting the relative positions of the cells with respect to the dots to ensure that the dots are contained within the cell boundaries forming the generated grid.

9. A process according to claim 1, in which the pattern of possible dots is decoded by comparing the datum grid with the generated grid and outputting a valid code signal if a minimum number of cells containing dots in the generated grid correspond to cells in the datum grid.

10. A process according to claim 1, in which before outputting a signal affirming that a valid code has been found, the validity of the code is checked by reference to error correcting bits and cyclic redundancy checks built into the dot matrix code.

11. A process according to claim 1, in which the dots of the dot matrix code comprise indentations in a surface of the article.

12. A process according to claim 11, in which the dot matrix code is illuminated by a light source shining obliquely onto the surface.

13. A process according to claim 12, in which the initial mask represents the appearance of an obliquely illuminated clean dot.

14. A process according to claim 1, in which the mask of step b) can be changed at the option of the operator.

15. A process according to claim 1, in which the captured image is a video image captured by a video camera and a video frame store.

16. A process according to claim 15, in which correlation includes scanning of the captured image line by line and pixel by pixel.

17. A process according to claim 15, in which correlation includes scanning the captured image such that selected of the pixels and/or lines of the captured image are skipped to increase scanning rates.

18. A process according to claim 5, in which, to avoid false detections of dot matrix codes, a further mask is generated only once.

* * * * *